F. B. SHAFER.
TEAT CUP FOR MILKING APPARATUS.
APPLICATION FILED DEC. 16, 1907.
950,145.
Patented Feb. 22, 1910.
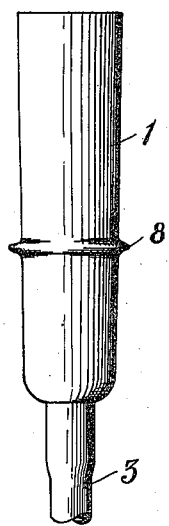
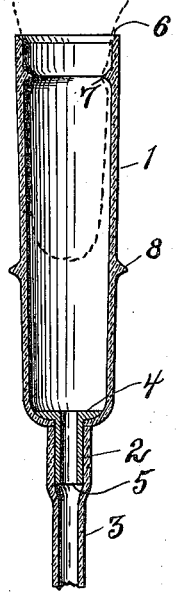
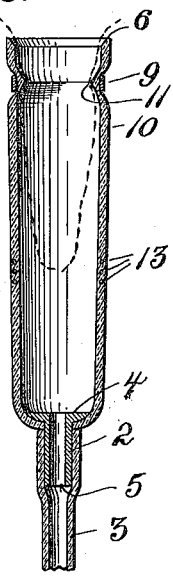
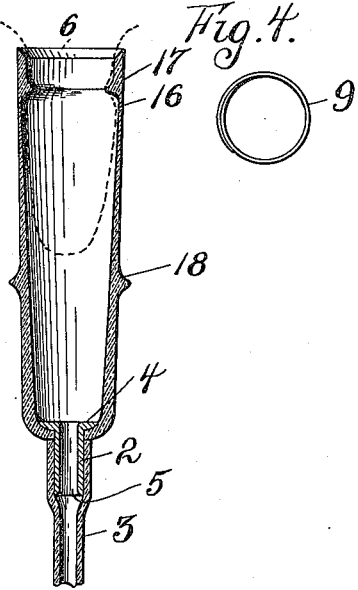
WITNESSES:
C. R. Stickney.
A. M. Dow.
INVENTOR
Frank B. Shafer,
By Barthel & Barthel
Attorneys.

UNITED STATES PATENT OFFICE.

FRANK B. SHAFER, OF NORTHVILLE, MICHIGAN, ASSIGNOR TO CHARLES E. ROGERS, OF DETROIT, MICHIGAN.

TEAT-CUP FOR MILKING APPARATUS.

950,145.   Specification of Letters Patent.   Patented Feb. 22, 1910.

Application filed December 16, 1907. Serial No. 406,680.

*To all whom it may concern:*

Be it known that I, FRANK B. SHAFER, a citizen of the United States of America, residing at Northville, in the county of Wayne and State of Michigan, have invented certain new and useful Improvements in Teat-Cups for Milking Apparatus, of which the following is a specification, reference being had therein to the accompanying drawings.

This invention relates to teat-cups for milking machines of the pneumatic pulsating type, and consists in the matters hereinafter set forth, and more particularly pointed out in the appended claims.

In the drawings, Figure 1 is a view in elevation of a teat cup embodying features of the invention. Fig. 2 is a view in longitudinal section of the cup. Fig. 3 is a view in longitudinal section of a modified form of cup. Fig. 4 is a view in detail of a removable exterior reinforcing member. Fig. 5 is a view in section of another form of teat-cup within the scope of the invention.

Referring to the drawings, 1 indicates the wall of a cup of rubber or like elastic yieldable material adapted to close over the teat of an animal, the lower end being provided with a hard or unyielding nipple 2 whereby it may be connected to a milk tube 3 of any preferred form of milking apparatus of the pneumatic pulsating type. This nipple may have a retaining head 4 and apertured stem 5 and may be removably secured in the body of the cup, or it may be of any preferred design affording proper connections and may be integral with the cup itself if desired.

The upper open end of the cup preferably has a slightly flared or beveled edge 6 for ready adjustment. An inner annular rib 7 near the top which in the preferred form is integral with the wall and has an inner margin which is quite thin or sharp, is adapted to closely grip the teat near its base and form a substantially tight joint thereon when its contents is exhausted by the vacuum producing means of the milking apparatus. A second annular reinforcement is provided mediate this first rib and the nipple to prevent restriction or collapse of the cup below the teat and to leave unimpeded passage for the milk. This, in the preferred form is an outer annular flange 8 integral with the cup wall. Obviously, the upper annular rib which is in effect a packing ring, may be replaced by an encircling spring or split ring 9 of metal, as shown in Figs. 3 and 4, the wall 10 of the cup being formed to present a rib 11 when contracted by the application of the ring. The non-collapsible reinforcing flange 8 of the preferred form may be replaced by any means affording support to the cup wall under vacuum, as for example, one or more metal rings 13 embedded in the wall as shown in Fig. 3. Any of these forms of reinforcement prevents collapse or restriction of the lower portion of the cup, and thus does not impede the flow of the milk therethrough.

In the modified form shown in Fig. 5, the wall 16 of the cup is reduced sharply just below the upper reinforcing rib 17, and then gradually increased to its normal thickness at or near the lower reinforcement 18. Under application of the vacuum, the weakest portion of the cup wall first closes in on the teat near its base and then the other portions follow, closely simulating the manual operation of milking.

The cup thus made is simple and effective in action, may be readily cleansed and sterilized and acts rapidly under influence of the vacuum apparatus. The upper constricted portion closely grips the teat so that the cup is held readily in place when once adjusted while the lower reinforcing zone prevents restriction of the passage of the milk.

Obviously details of construction may be varied without departing from the spirit of the invention, and I do not limit myself to any particular form or arrangement of parts.

What I claim as my invention is:—

1. A teat cup for a milking apparatus comprising a tube of elastic material adapted to be drawn over and yieldingly grip the teat of an animal near one end and to be connected at its other free end to a milk pipe, and an annular non-collapsible reinforcement intermediate its ends, integrally formed on the wall.

2. A teat cup for a milking apparatus comprising a tube of elastic material yieldingly constricted near one end, a milk pipe connection at the other end, and an annular non-collapsible reinforcement intermediate its ends, formed integrally with the wall.

3. A teat cup for a milking apparatus comprising a tube of elastic material adapted to maintain its form when not under exterior pressure, an inner annular constricted rib integral with the tube wall near one end, a milk pipe nipple in the other end of the tube, and an annular non-collapsible exterior flange integral with the wall of the tube between the inner rib and nipple.

4. A teat cup for a milking apparatus comprising a tube of elastic material adapted to maintain its form when not under working pressure, whose lower end is provided with an inturned nipple retaining rim, a nipple of non-collapsible material having a head bearing outwardly against the tube rim and hollow stem extending through the rim, an inner annular rib near the upper end integral with the tube wall, and an outer annular flange integral with the tube wall near the nipple.

5. A teat cup for a milking apparatus comprising a tube of elastic material adapted to maintain its form when not under working pressure, whose lower end is provided with an inturned nipple retaining rim, a nipple of non-collapsible material having a head bearing outwardly against the tube rim and hollow stem extending through the rim, an inner annular rib near the upper end integral with the tube wall, and an outer annular flange integral with the tube wall near the nipple, the tube wall being reduced in thickness close to the rib and increasing therefrom to normal thickness near the reinforcement.

In testimony whereof I affix my signature in presence of two witnesses.

FRANK B. SHAFER.

Witnesses:
C. R. STICKNEY,
A. M. DORR.